Jan. 9, 1934. G. A. BIGGS 1,942,589
HYDRAULIC TURBINE
Filed June 21, 1932
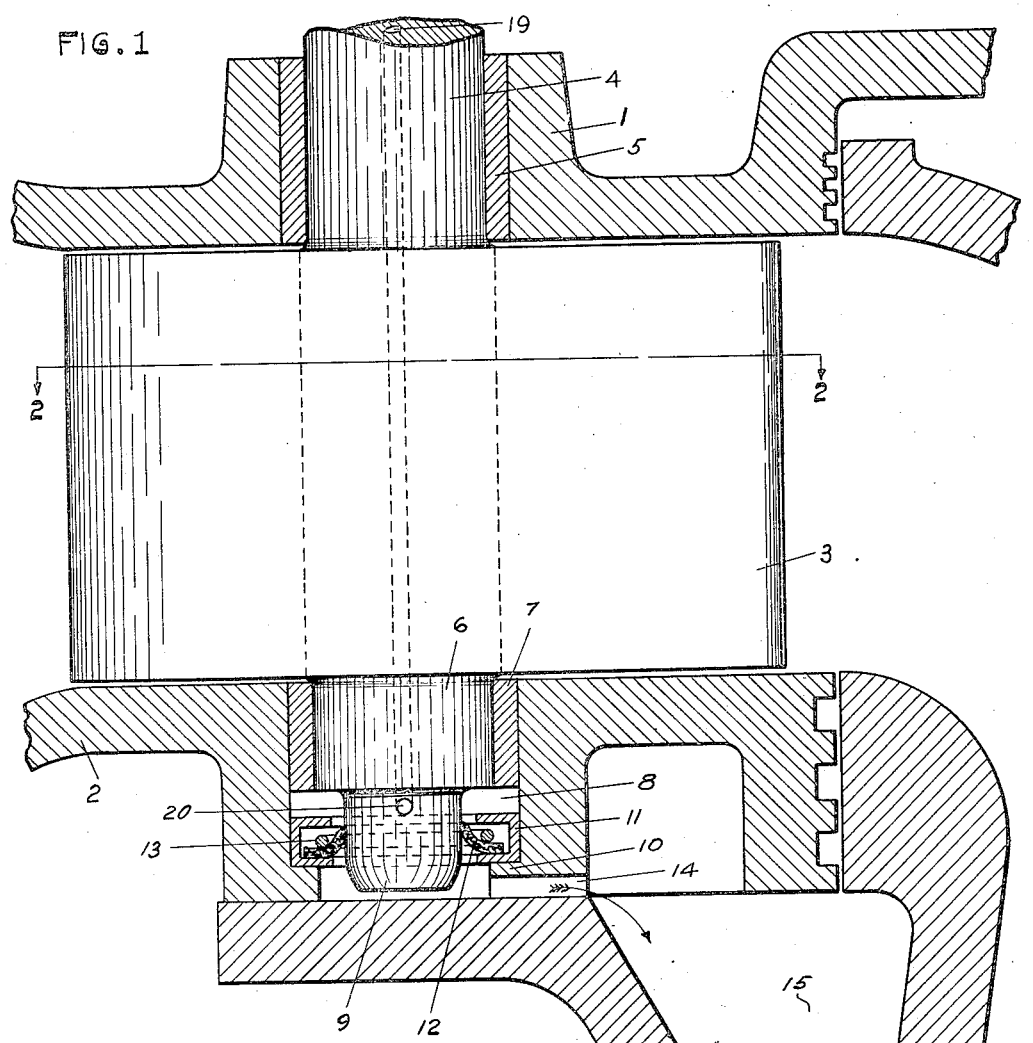
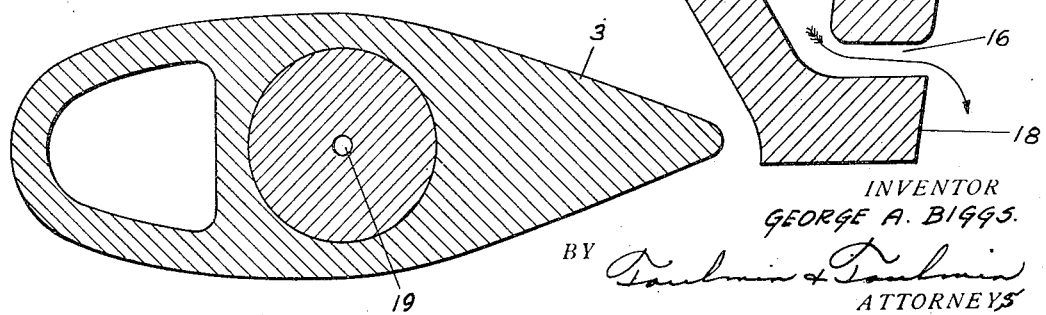
INVENTOR
GEORGE A. BIGGS.
BY
ATTORNEYS Patented Jan. 9, 1934

1,942,589

UNITED STATES PATENT OFFICE 1,942,589

HYDRAULIC TURBINE

George A. Biggs, Springfield, Ohio, assignor to The James Leffel & Company, Springfield, Ohio, a corporation of Ohio Application June 21, 1932. Serial No. 618,492

10 Claims. (Cl. 253—122)

My invention relates to hydraulic turbines, and, in particular, to means for relieving the pressure on the gates.

It is my object to provide, particularly where the head is high and the pressure of water under the gate tends to force the gate upwardly, a counter balancing mechanism in order to maintain the gate in its normal position.

The amount of upward pressure is equal to the static head acting on the projected or cross sectional area of the gate stem at the top.

Under many conditions this is enough to overbalance the weight of the gate and raise it upwardly.

It is my object to prevent this by the mechanism of the present invention.

Referring to the drawing:

Figure 1 is a vertical section through the gate support showing the gate in elevation;

Figure 2 is a section on the line 2—2 of Figure 1.

Referring to the drawing in detail, 1 indicates the upper gate ring and 2 the lower gate ring. A gate 3 has an upper gate stem 4 mounted in the bearing 5 in the upper gate ring 1. It is provided with a lower stem 6 mounted in the bearing 7 in the lower gate ring 2.

This lower gate ring 2 is provided with a chamber 8 which receives the bearing sleeve 11 and the lower restricted end 9 of the stem 6. A shoulder 10 is formed on the bottom of the chamber 8 for supporting a sealing channel 11 that carries a washer of leather 12 and a coil spring 13 that holds the washer against the restricted tapered end 9 of the stem 6.

The lower end of this chamber is drained through the passageway 14 into the vacuum 15 that makes its exit at 16 into the draft tube formed by the ring 17 and the sleeve 18.

By my invention, I provide a seal to prevent leakage around the trunnion or bearing between the stem 6 and the sleeve 11 and still permit the vacuum to act against the lower end of the stem on a lesser area due to the diameter of the restricted stem 9. It is not intended to entirely eliminate all the upward thrust but a sufficient amount so that the weight of the gate will hold itself down.

The outlet 14 is provided to allow water under pressure to escape into the vacuum chamber 15.

I provide a passageway through the stem 4 designated 19 which makes its exit at 20 and communicates with the vacuum 14.

The purpose of the vacuum 15 and the passageway 14 is to remove from the chamber 8 any fluid that might accumulate therein, thereby relieving the upward pressure on the gate, and in order to prevent a suction created by the vacuum 15 tending to draw the water into the chamber, an air passageway 19 is provided which extends from the point 20 within the chamber 8 to any suitable point in the stem 4. This passageway 19 may extend the full length of the stem 4.

Having thus fully described my invention, what I claim as new and desire to secure by Letters Patent, is:

1. In a hydraulic turbine, a gate having an upper bearing shaft and lower bearing shaft with a restricted end, supporting rings therefor for guiding the water over the gate and supporting it, one of said rings forming a water receiving chamber around said restricted end.

2. In a hydraulic turbine, a gate having upper and lower bearing shaft members, means including a chamber to produce a vacuum beneath the lower bearing shaft member, said lower bearing shaft member having a restricted end in said chamber.

3. In a hydraulic turbine, a gate having upper and lower bearing shaft members, means including a chamber to produce a vacuum beneath the lower bearing shaft member, said lower bearing shaft member having a restricted end in said chamber, and sealing means in the chamber engaging said restricted end.

4. In a hydraulic turbine, a gate having upper and lower bearing shaft members, means to produce a vacuum beneath the lower bearing shaft member, said lower bearing shaft member having a restricted end, sealing means engaging said restricted end, and means leading from the top bearing member through the gate communicating with the bottom of the lower bearing member to permit the free passage of air therethrough.

5. In a hydraulic turbine, a gate having vertically, oppositely-disposed bearing shaft members, the lower one of which is restricted into a bearing member of lesser diameter, an upper gate ring engaging the upper bearing member, a lower gate ring engaging the lower bearing member and forming a chamber around the restricted end thereof, a sealing ring carried by the lower gate ring having sealing means engaging the lower restricted portion of the lower bearing member.

6. In a hydraulic turbine, a gate having vertical, oppositely-disposed bearing shaft members, the lower one of which is restricted into a bearing member of lesser diameter, an upper gate ring engaging the upper bearing member, a lower gate ring engaging the lower bearing member and forming a chamber around the restricted end thereof, a sealing ring carried by the lower gate ring having sealing means engaging the lower restricted portion of the lower bearing member, and means of creating a vacuum at the bottom of said chamber.

7. In a hydraulic turbine, a gate having vertical, oppositely-disposed bearing shaft members, the lower one of which is restricted into a bearing member of lesser diameter, an upper gate ring engaging the upper bearing member, a lower gate ring engaging the lower bearing member and forming a chamber around the restricted end thereof, a sealing ring carried by the lower gate ring having sealing means engaging the lower restricted portion of the lower bearing member, and means of creating a vacuum at the bottom of said chamber, said vacuum means comprising a passageway from the bottom of said chamber communicating with the draft tube whereby the flow of water over the gate through the draft tube will produce a vacuum in said chamber.

8. In a hydraulic turbine, a gate having upper and lower bearing members, the lower bearing member having a restricted end, means to form a support for the lower bearing member and a chamber around said restricted end, a seal between the walls of said chamber and said restricted end to prevent leakage around the restricted end of the bearing member, and means to create a vacuum below said sealing means in said chamber to relieve the pressure on the lower end of the bearing member.

9. In a hydraulic turbine, a gate having upper and lower bearing members, the lower bearing member having a restricted end, means to form a support for the lower bearing member and a chamber around said restricted end, a seal between the walls of said chamber and said restricted end to prevent leakage around the restricted end of the bearing member, means to create a vacuum below said sealing means in said chamber to relieve the pressure on the lower end of the bearing member, and a passageway leading through said gate from the top bearing member communicating with the chamber below the lower bearing member.

10. In a hydraulic turbine, a gate having upper and lower bearing members, the lower bearing member having a restricted end, means to form a support for the lower bearing member and a chamber around said restricted end, a seal between the walls of said chamber and said restricted end to prevent leakage around the restricted end of the bearing member, means to create a vacuum below said sealing means in said chamber to relieve the pressure on the lower end of the bearing member, and a passageway leading through said gate from the top bearing member communicating with the chamber below the lower bearing member at a point above said sealing means.

GEORGE A. BIGGS.